US008734053B1

United States Patent
Sackett

(10) Patent No.: US 8,734,053 B1
(45) Date of Patent: May 27, 2014

(54) ARTICULATED BAFFLE ASSEMBLY

(76) Inventor: Gerald L. Sackett, Charlottesville, VA (US)

( * ) Notice: Subject to any disclaimer, the term of this patent is extended or adjusted under 35 U.S.C. 154(b) by 208 days.

(21) Appl. No.: 13/072,776

(22) Filed: Mar. 28, 2011

Related U.S. Application Data

(60) Provisional application No. 61/319,389, filed on Mar. 31, 2010.

(51) Int. Cl.
E02B 8/02 (2006.01)
(52) U.S. Cl.
USPC ............... 405/74; 405/40; 405/124; 210/521; 210/532.1
(58) Field of Classification Search
USPC .................. 405/39, 40, 74, 80, 124; 210/162, 210/170.03, 747.2, 521, 532.1, 801
See application file for complete search history.

(56) References Cited

U.S. PATENT DOCUMENTS

| 231,544 | A | | 8/1880 | Darst |
| 1,666,756 | A | | 4/1928 | Sass |
| 1,999,637 | A | | 4/1935 | Pettepher |
| 2,667,185 | A | * | 1/1954 | Beavers ......................... 138/37 |
| 3,066,655 | A | | 4/1963 | Compton |
| 4,713,179 | A | | 12/1987 | Goedderz |
| 5,037,542 | A | * | 8/1991 | Carroll ......................... 210/161 |
| 6,017,166 | A | | 1/2000 | Mossburg, Jr. |
| 6,017,377 | A | | 1/2000 | Brown |
| 6,196,762 | B1 | | 3/2001 | Stude |
| 6,237,720 | B1 | * | 5/2001 | Sutton ......................... 184/106 |
| 6,334,953 | B1 | | 1/2002 | Singleton |
| 6,416,674 | B1 | | 7/2002 | Singleton |
| 6,428,693 | B2 | | 8/2002 | Singleton |
| 6,478,954 | B1 | | 11/2002 | Turner, Jr. |
| 6,595,721 | B2 | | 7/2003 | Kincheloe |
| 6,668,390 | B1 | | 12/2003 | Gonzalez |
| 6,673,135 | B2 | | 1/2004 | West |
| 6,709,500 | B1 | | 3/2004 | West |
| 6,824,677 | B2 | | 11/2004 | Martinez |
| 6,942,425 | B2 | | 9/2005 | Kincheloe |
| 7,052,210 | B2 | | 5/2006 | Kurdziel |
| 7,074,326 | B2 | | 7/2006 | Singleton |
| 7,179,371 | B1 | | 2/2007 | Bistline |
| 7,491,338 | B2 | | 2/2009 | Nino |
| 7,537,627 | B2 | | 5/2009 | Scherrer |
| 2007/0154266 | A1 | | 7/2007 | Wasserman |
| 2007/0266854 | A1 | | 11/2007 | Scherrer |
| 2009/0279954 | A1 | | 11/2009 | Griffith |

FOREIGN PATENT DOCUMENTS

WO WO/01/00939 1/2001

* cited by examiner

Primary Examiner — Sean Andrish
(74) Attorney, Agent, or Firm — Denis R. O'Brien

(57) ABSTRACT

An articulated baffle assembly is disclosed and claimed. The battle assembly includes a support and vanes connected to the support. The support holds the vanes in the flow of a liquid in order to promote sedimentation when the baffle assembly is in an operational configuration. The support includes an articulation that allows the baffle assembly to be reversibly converted to a retracted configuration that facilitates access to and removal of sediment.

18 Claims, 6 Drawing Sheets

ARTICULATED BAFFLE ASSEMBLY

CROSS-REFERENCE TO RELATED APPLICATION

This application claims the benefit of U.S. Provisional Application No. 61/319,389, filed by Gerald L. Sackett on Mar. 31, 2010.

BACKGROUND

The field of the invention is sediment traps, particularly sediment traps for culverts.

The term "culvert" is used herein to mean a conduit used to enclose, contain, and direct a flowing liquid, generally surface run-off water. In situations where end-pieces are employed, the term "culvert" includes the end pieces. It is to be understood that culverts are used herein as an exemplary and valuable application of the invention but that the scope of the invention goes beyond culverts and run-off water, as will be evident by this disclosure.

Normally culverts are used to provide a passageway for water to pass underneath a road, railway, embankment, or other man-made structure placed across the natural path of the water. Thus, the culvert protects the structure from wash-out and prevents flooding.

Culverts may have any of a variety of shapes in cross-section, but round and oval shapes predominate. Although the embodiments of the invention presented herein show round or oval culverts, the invention is equally and easily adapted to culverts of any shape. Typically culverts are made of concrete, metal, or synthetic materials. The present invention is applicable to culverts made of any material.

Culverts have an inlet and an outlet, the openings through which the water enters and exits the culvert, respectively. Often these inlets and outlets are produced separately as specially designed and molded "end pieces." The end pieces are then attached to the conduit when the culvert is put in place. Because a simple round pipe placed in the path of flowing water does not efficiently channel the water into the pipe, culvert inlets and end pieces are often flared to act as a funnel. Such funneled or flared inlets can create a venturi effect in high water flows whereby the velocity of the water is at a maximum as the water is funneled into the body of the conduit. The water velocity then decreases inside the culvert, which causes problems.

Culverts are normally straight and sloped downwards in the downstream direction in order to insure afflux of the water from the inlet to the outlet and thereby minimize slowing or standing of the water while inside the culvert. But in some situations it is necessary to have one or more curves along the length of the conduit, and sometimes culverts, particularly those made of plastics, develop a "belly." Such bellies also cause problems.

Typically, because of resistance of the walls of the culvert, a venturi effect at the inlet, curves, bellying, etc, the velocity of flow of water decreases inside the culvert. This is problematic because it promotes the settling out of sediments inside the pipe where the sediments are difficult to reach and remove. This process of depositing sediments is referred to herein as "sedimentation."

As the sediment accumulates within the culvert, particularly under low-flow conditions, water flow becomes restricted and the water pools and backs up inside the culvert, which promotes even faster sedimentation inside the culvert. The sediment may eventually dry out to form a solid mass. Vegetation may begin to grow in the sediment, in which case the roots hold the sediment together. Consequently, when subsequent storm flow occurs, the culvert may be too occluded to handle the flow. Under such conditions, the water backs up and flooding occurs, often damaging the roadway or other structure the culvert was installed to protect. An entire roadway can be washed away in flood conditions because the underlying culvert is unable to handle the full flood flow for which it was initially designed. This causes very significant loss of property and also puts lives at risk.

Of course, the removal of sediment from far inside a culvert is much more difficult and costly than removal of sediment right at the inlet. Given that there are hundreds of thousands of culverts within the United States, the cost of periodic removal of sediment from inside culverts is enormous—to both the private sector and public sector. Large culverts must often be drilled or reamed out; small culverts often need to be replaced entirely. Consequently, the prevention of sedimentation of culverts is preferred over the removal of sediment and there is a strong demand for effective and inexpensive ways to prevent sedimentation from occurring within culverts, which is what the present invention does.

SUMMARY OF THE INVENTION

The present invention provides a baffle assembly that acts as a sediment trap at the inlet of a culvert. The sediment trap slows the flow of the water within or just upstream of the culvert inlet thereby promoting sedimentation at or near the inlet where the sediment is easily seen and removed. Sedimentation deep within the culvert is mitigated or prevented so that both the inspection and maintenance of the culvert becomes easier and cheaper, thereby reducing the costs of culvert maintenance, repair, and replacement. The end result is that by employing the invention, the preventative maintenance of culverts is facilitated thereby reducing—and potentially avoiding altogether—injuries, deaths, and property damage, including damage to the culvert, caused by flooding.

The baffle assembly comprises a plurality of vanes attached to a support so that when the baffle assembly is in an operational configuration, the vanes are held in the flow of water entering a culvert. The vanes are oriented so that they impede the flow of the water sufficiently to promote sedimentation. The baffle assembly includes at least one articulation, for instance, a hinge, so that the vanes and support can be easily converted to a retracted configuration in order to facilitate the removal of the sediment. The term "articulation" and its grammatical congeners are used herein to mean a joint between two structures that allows one of the structures to move with respect to the other.

The term "vane" is used herein slightly differently than it's normal usage, which normal usage is a blade or plate that is moved by a fluid, often about a hub. Herein the term "vane" refers to a blade held in the path of a flowing liquid, thereby slowing the flow of the liquid, perturbing laminar flow of the liquid, and directing the liquid around the blade.

DETAILED DESCRIPTION OF THE INVENTION

Figure 1:
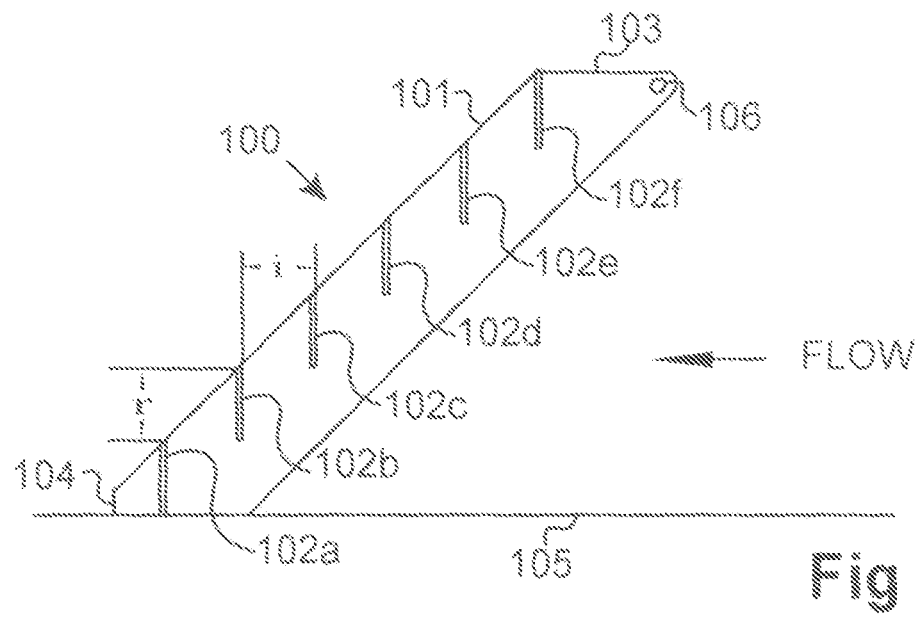
FIG. 1 is a side elevation of a simple baffle assembly in an operational configuration according to one preferred embodiment the invention.

FIG. 1 is a side elevation of a simple baffle assembly 100 in an operational configuration according to one preferred embodiment the invention. The baffle assembly comprises a support 101 and a plurality of vanes 102a-102f. For ease of description, the terms "up," "down," "upper," "higher," "lower," "vertical," "horizontal," and other directional terms used herein are relative to the floor of the culvert or streambed unless otherwise stated. For instance, "vertical" means substantially normal to the streambed or floor of the culvert. "Horizontal" means parallel to the streambed or floor of the culvert. As a result of these definitions, even if the reference culvert is sloping, the directional terms used herein will be relevant. The terms "upstream" and "downstream" are directional terms used with respect to the intended direction of water flow, which is generally from right to left in the figures, as indicated in FIG. 1.

The support 101 is a frame or other structure that functions to support the vanes and to hold the vanes in the flow, the flow in FIG. 1 being from right to left as indicated. The baffle assembly has an upper end 103 and a lower end 104. The lower end generally rests on the ground or streambed 105 or other supporting surface, which may be specially constructed.

The preferred vanes 102a-102f are generally elongate structures. They may have a substantially rectangular profile with curved or contoured ends as discussed below. Consequently, the vanes have a long axis that lies along the length of the vane and a cross-axis that lies along the width of the vane. The long axis is normally oriented substantially horizontally and parallel to the plane of the streambed. The vane cross-axis is perpendicular to the long axis.

In FIG. 1 the baffle assembly is viewed from the side so that the vanes are seen from on end thereof. In this embodiment the vane cross-axis is substantially vertical. The "vane angle" ("$\alpha$", herein) is the angle by which the cross-axis deviates from vertical. A positive a indicates that the top of the vane is tilted downstream. A negative a indicates that the top of the vane is tilted upstream. The preferred $\alpha$ is 0 degrees, and a preferred range of $\alpha$ is plus or minus 60 degrees. Of course, an $\alpha$ of plus or minus 90 degrees would indicate that the vane is parallel to the flow and the vane would have no effect.

Referring again to FIG. 1, the vane furthest downstream, i.e., vane 102a, is the lowest vane on the baffle, whilst the vane furthest upstream, vane 102f, is the highest. Thus, the vanes progress vertically from the downstream vane to the upstream vane such that each vane is higher than the adjacent downstream vane when the baffle assembly is in the operational configuration.

The vertical distance between the top of one vane and the top of its adjacent neighbor is referred to herein as the "rise." The rise is designated by "r" in FIG. 1. In this preferred embodiment the rise, r, is substantially equal to the width of the vane, so that the top of one vane is at substantially the same height as bottom of the adjacent upstream vane.

The vanes are also spaced apart horizontally, thereby leaving a space or inter-vane interval between the vanes to allow passage of liquid. This interval is indicated by "i" in FIG. 1. The rate of rise of the vanes is, thus, substantially, r/i, ignoring the thickness of the vanes, which is negligible.

In a present best mode known to me, using a 15 inch culvert as an example, i is approximately 3 inches and r is approximately 3 inches. The angle subtended between support 101 and streambed 105 is approximately 45 degrees and $\alpha$ is approximately 0 degrees. These values are exemplary and can be modified without undue experimentation to meet the needs of a given culvert size, shape and expected flow.

Figure 3:
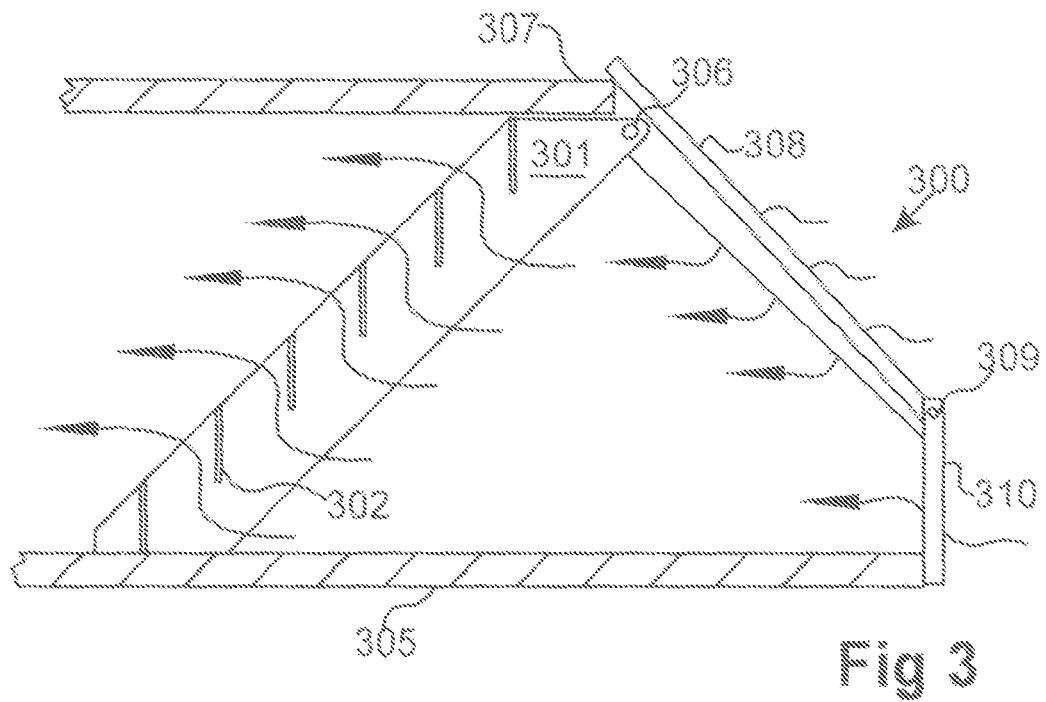
FIG. 3 shows a side view of a multiply-articulated embodiment of the invention in an operational configuration.

An anchor may be required to secure the support in place and hold it there during high water flow. The anchor may be a foot, post, stake, or bar driven into the ground. It may be the culvert itself, or a bolt or other anchor-point integrated with the culvert. It may be a grate or frame, or even a wire or rod placed across the inlet. The anchor can be virtually any structure that holds the baffle assembly in place. An exemplary anchor 310 is shown in FIG. 3, and discussed in more detail below.

One end of the support 101 includes an articulation, such as hinge 106. The articulation may be at the top or bottom of the support, depending on the design considerations. This articulation is used to rotatably connect the support to another structure, which may be another component of the baffle assembly such as a grate or anchor, or may be a fixed structure such as the culvert or inlet. The functional point is the same regardless of the precise structure; i.e., to allow the baffle assembly to be rotated about this articulation. In this way the baffle assembly is reversibly positioned in one of either an operational configuration or a retracted configuration. The term operational configuration means that the device is in position to facilitate sedimentation. The term retracted configuration means that the device is in position to facilitate access to and removal of sediment.

Figure 2:
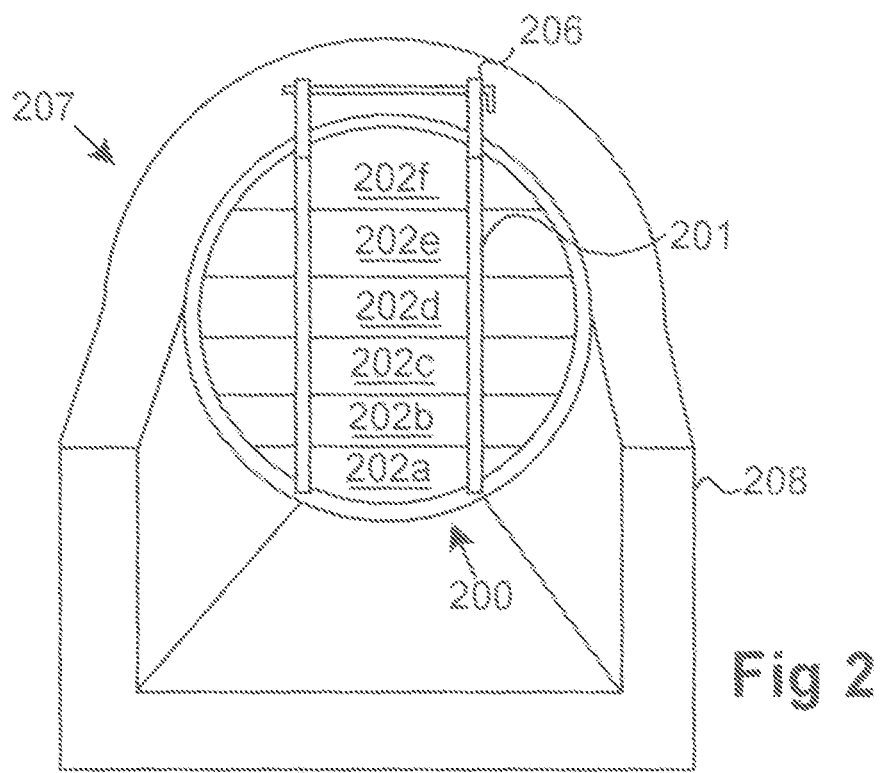
FIG. 2 shows a front view of a baffle assembly according to the invention mounted at the inlet of a culvert.

FIG. 2 shows a simple baffle assembly 200 according to the invention. The baffle assembly is shown mounted at the inlet of a culvert 207, which is of a type of culvert having an end piece 208. The view is into the culvert. Six vanes 202a-202f are shown. The vanes are carried by the baffle support 201, which is a pair of rails. The support may also have cross-members between the rails not shown in this view. Alternatively, the support could be a central rail, for instance, with the vanes extending outwards. It could be a frame. Many functionally equivalent alternative support structures will be evident from this disclosure.

As shown in FIG. 2 the ends of the vanes may be contoured to approximate the curvature of the culvert, thereby minimizing the flow of water around the ends of the vanes. The articulation of the device shown in FIG. 2 is a simple hinge 206 such as a rod supported by two eyes that are bolted to or built into the culvert.

In FIG. 3 is shown another preferred embodiment of the invention employing a more complex articulation. The baffle assembly 300 is shown in its operational configuration placed at the inlet 307 of a culvert. Water flow, from right to left, is indicated by the arrows. The baffle assembly includes a plurality of vanes as discussed above, one of which is indicated as 302. The vanes are connected to and held in place by support 301. The stream bed or bottom portion of the culvert end piece is indicated as 305.

The baffle assembly of FIG. 3 includes a rotating member which may be, for example, a grate 308 or a lever, or a bar, or some combination thereof. The grate acts as a sieve for preventing large debris from entering the culvert. The grate also impedes children and other small pests from entering the culvert and causing problems. The upper end of support 301 is rotatably attached by first articulation 306 to an upper end of the grate. The lower end of the support rests on the bottom of the culvert or on the stream bed. The lower end of the grate 308 is rotatably attached by a second articulation 309 to a suitable anchor, such as foot 310.

Figure 4:
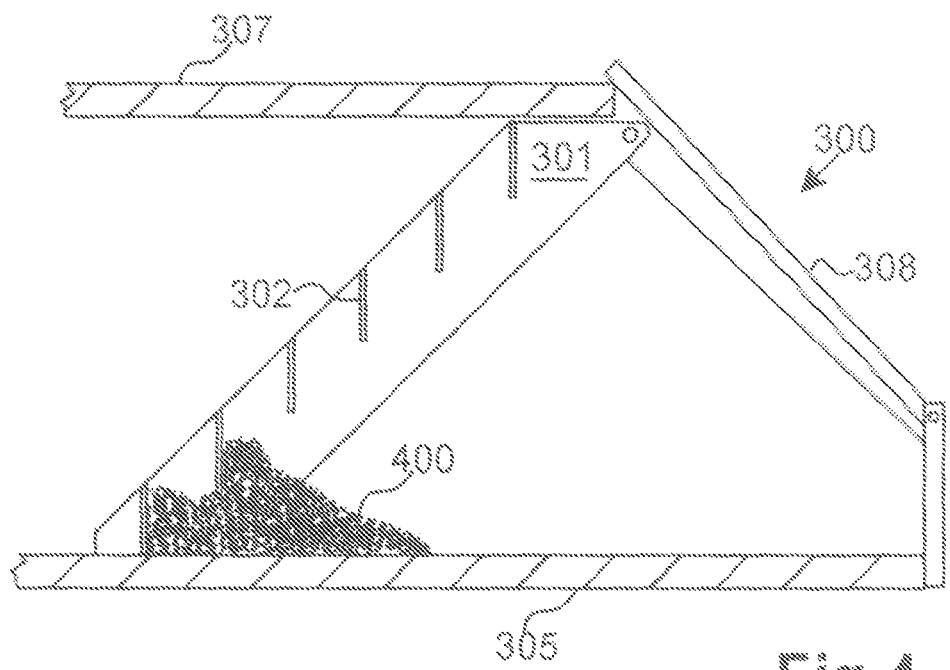
FIG. 4 illustrates the manner in which sediment builds up at the upstream surface of the vanes of the invention.

As shown in FIG. 3 the water flows though the grate and toward the vanes, which momentarily slow the water, cause it to eddy, and divert it upwards. The $\alpha$ shown in FIG. 4 is substantially 0 degrees; i.e., vertical. The water is thus forced to slow down and flow virtually straight upwards in order to overcome the barrier presented by the vanes. This perturbation in the flow of the water encourages sedimentation adjacent to and on the upstream side of the vanes. The sediment deposited here is thus prevented from entering the culvert.

FIG. 4 illustrates the manner in which sediment 400 builds up at the upstream surface of the vanes after a number of high-flow episodes. Were it not for the invention, much of this sediment would have settled out inside the culvert where it would be hard to remove and where it would eventually plug the culvert.

As the sediment accumulates at the bottom of the baffle assembly, it occludes passage of water between the lowest vanes. If the sediment is not removed, it will build up even more and increasingly impede flow between higher vanes; consequently, the water will begin to back up at the inlet and it will pool upstream from the inlet. This pooling of water outside the culvert is a very evident indication that the sediment needs to be cleared. In many situations workers will be able to detect this tell-tale pooling—or the absence thereof—from the roadway without even leaving their vehicle.

Figure 5:
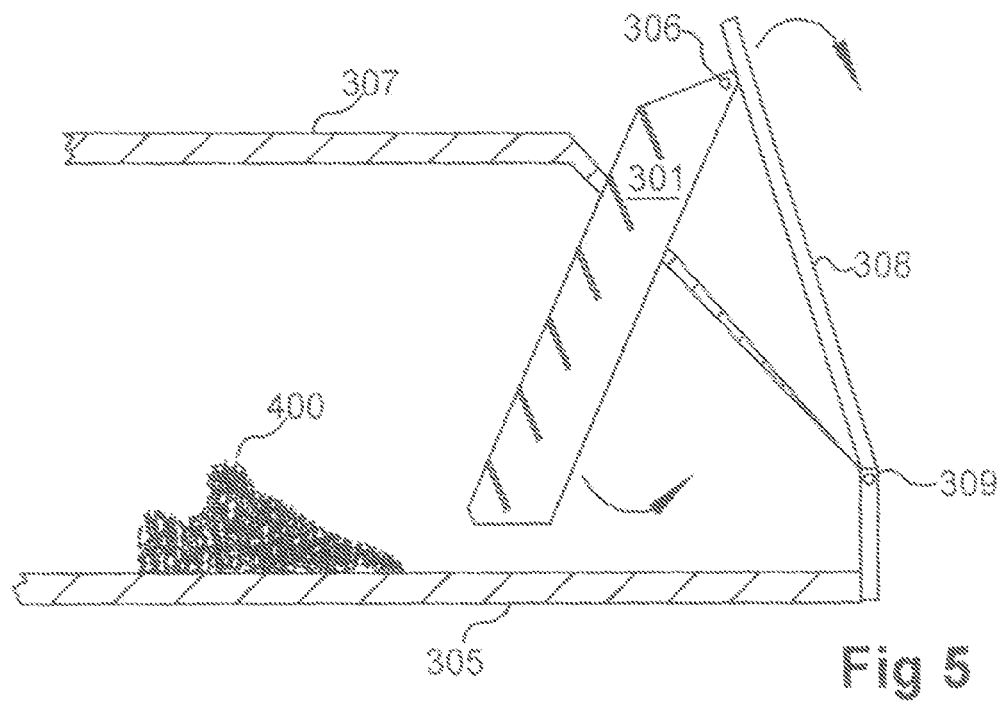
FIG. 5 is a side view of the baffle assembly of FIG. 3 in the process of being retracted.

Referring now to FIG. 5, the first step in accessing the sediment for removal is illustrated. Arrows in the figure indicate the directions of movement of the components of the baffle assembly when converting the baffle assembly from the operational configuration to a retracted configuration. Namely, the baffle assembly is opened by lifting the upper free end of the grate 308 and pivoting the grate about its hinged connection with foot 310, which hinged connection is the second articulation 309. As a result of the first articulation 306 between the upper end of support 301 and grate 308, the lower end of the support 301 pivots toward the grate.

Figure 6:
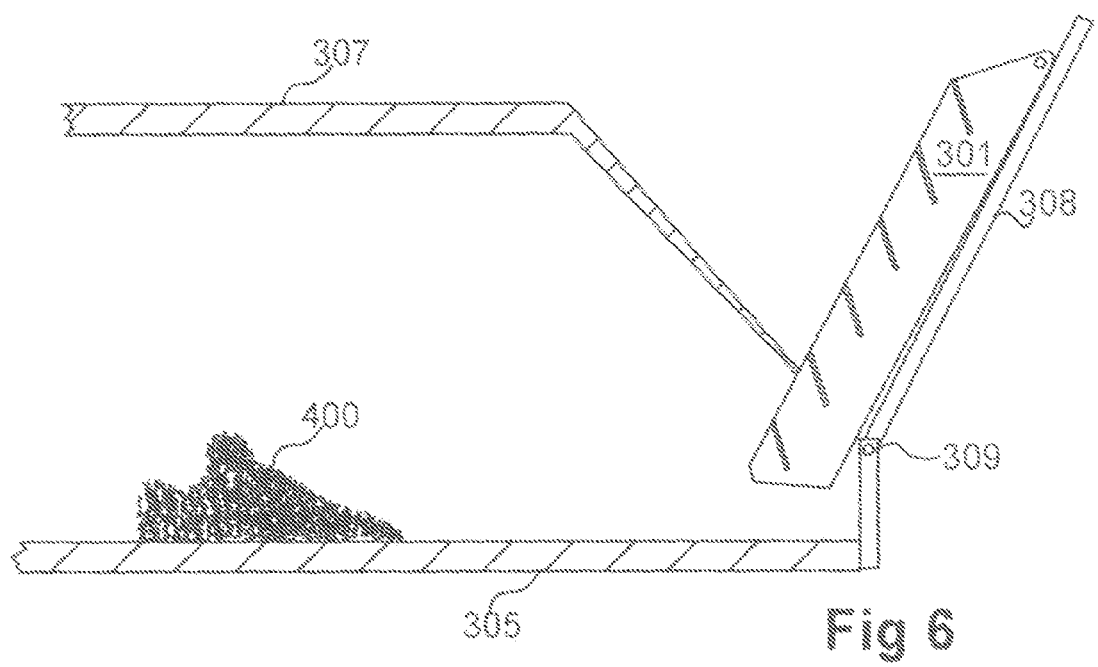
FIG. 6 is the side view of FIG. 5 showing the baffle assembly in a retracted configuration.

As shown in FIG. 6, the support 301 folds up against the grate where it is out of the way and thereby facilitates efforts to remove the sediment 400. This is what is referred to herein as the retracted configuration. If desired, the upper end of the grate can be rotated all the way down to the ground to insure that the baffle assembly does not interfere with the sediment removal.

It will be appreciated that in this embodiment the grate is being used as an arm to gain mechanical purchase for moving the support and vanes. This function can be alternatively provided by a rotating member generally that rotates about an articulation, for instance, a rigid bar in place of grate 308. Alternatively, a multiply articulated lever system may be incorporated to make it easier to move the grate and baffle.

Figure 8:
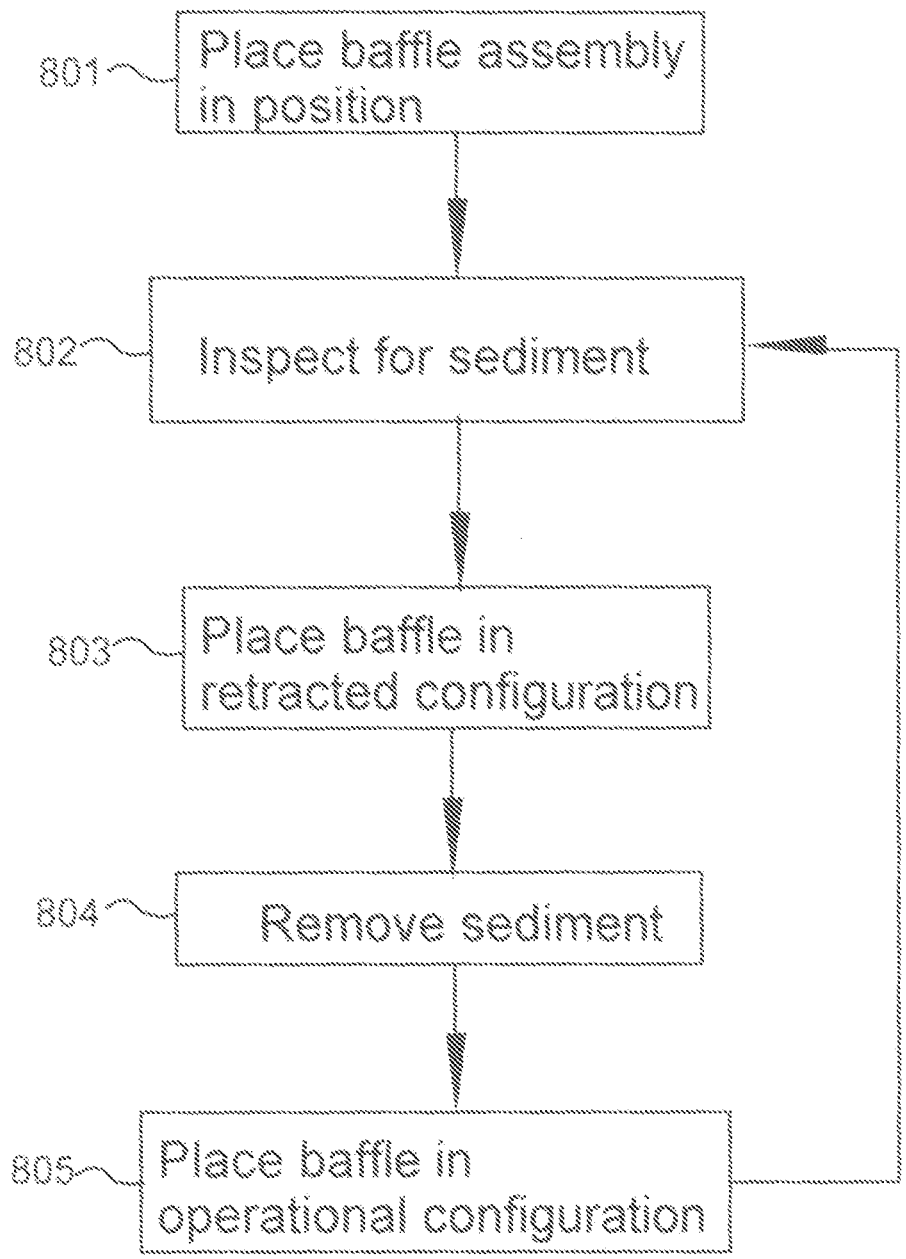
FIG. 8 is a flow diagram of a method of using the baffle assembly.

The invention includes a method of using the baffle assembly disclosed above to promote sedimentation at the inlet of a culvert. An embodiment of one such method, summarized in the flow diagram of FIG. 8, is now disclosed.

The baffle assembly is placed in the inlet of a culvert 801 in the operational configuration. Over a period of time the inlet is inspected 802 for accumulated sediment or for tale-tell pooling of water. When enough sediment has accumulated that removal is warranted, the baffle is placed in its retracted configuration 803 and the sediment is removed 804. The baffle is then put back into the operational configuration 805 and the inlet is again periodically inspected 802.

Embellishments, Variations, and Details

Recall that the preferred vanes shown in FIG. 4 are planar in cross-section; however, the vanes are not restricted to any particular shape. They can, for instance, be curved when viewed in cross-section so that they present a concave or convex surface to the flow of the liquid. In some situations the best effect may be obtained by having differently shaped vanes at different positions in a single baffle assembly.

In most situations the preferred vane angle, $\alpha$, is 0 degrees as disclosed above. However, in some circumstances this angle may advantageously vary from 0 degrees. Nor is it necessary that all of the vanes have the same $\alpha$. It may be advantageous, for instance, to have the upper vanes with a negative $\alpha$ and the lower vanes with a positive $\alpha$. Many of these details are dependent upon the flow rates and volumes of the individual site but will be easily determined without undue experimentation. The essential feature is that the vanes promote sedimentation upstream of the vanes.

The articulated baffle assembly illustrated and described above is but one preferred embodiment of the invention, and is particularly preferred for larger culverts. The figures show the hinged articulations in but one possible configuration. The invention may be implemented, for instance, such that the grate 308 swings upwards and towards the culvert rather than away from it. There may be more or fewer articulations. An articulated lever system may be incorporated to make it easier to place the baffle assembly in the retracted configuration. The articulated lever, operated from outside the grate, connects to the top of the support to drop the top of the support downwards, thereby making it easier to use the grate to remove the baffle from the culvert. In some situations, such as small culverts, the grate and/or articulations associated with the grate may be dispensed with altogether, as shown in FIG. 2.

Figure 7:
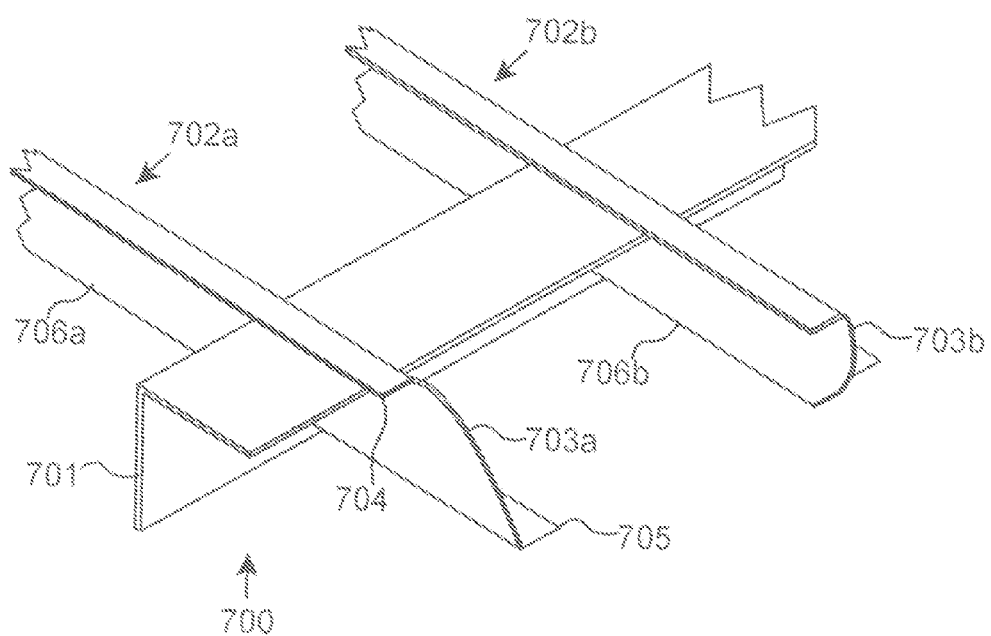
FIG. 7 is a perspective drawing showing the detail of the support and vane assembly of one embodiment of the invention.

FIG. 7 is an example showing the detail of how the vanes and the support may be implemented. In the preferred embodiment the support 700 comprises two parallel rails, one of which 701 is shown in the figure. Vanes 702a and 702b are connected to rail 701 by, for instance, welds or bolts. The preferred vanes are roughly "Z" or "S" shaped in cross-section as shown, having a blade 706a and 706b that has its longitudinal edges bent to form a first, or upper, edge 704 and an opposing second, or lower, edge 705. The blade may be substantially normal to the first and/or the second edges. The vane edges of the present best mode are approximately 1 inch in width. The upper edge acts as a point of attachment to the rail. The lower edge promotes eddying of the fluid, and, hence, sedimentation. This is, of course, one of many possible vane designs that fall withing the scope of this disclosure. The vanes may be, for instance, solid or hollow. Any vane structure that is consistent with the objective of promoting sedimentation upstream of the vane falls within the scope.

As also shown in FIG. 7, the ends 703a and 703b of the vanes may be curved or otherwise contoured to the shape of the culvert in order to achieve a close fit between the vanes and the culvert. This minimizes the flow of water around the ends of the vanes, which would reduce the sedimentation effect of the vanes. The vanes are typically formed or trimmed to within 0.5" of the inside surface of the pipe to avoid frictional forces that would impede removal of the baffle assembly from the pipe.

In some applications it may be necessary to collect a very high percentage of solids in the liquid and so it may be desirable for the ends of the vanes to contact the pipe, in which case the vanes or the tips or ends of the vanes may be constructed of vinyl, rubber, or other pliable material. A filter material can also be applied across the inter-vane opening to filter fine particulate materials.

The spacing between adjacent vanes, referred to above as the inter-vane interval (i), and the vane angle ($\alpha$) will be a function of the specific application and specifications. Indeed, i and $\alpha$ need not necessarily be fixed, as the scope of the invention accommodates baffle assemblies with adjustable vanes. Likewise, the rise (r) will be determined by the width of the vanes, and it, too, will vary from site to site and, possibly, within a single baffle assembly.

Although metal is presently preferred, the invention may be constructed of any type of material that allows the vanes to be held within the flow sufficiently firmly to promote sedimentation.

Figure 9:
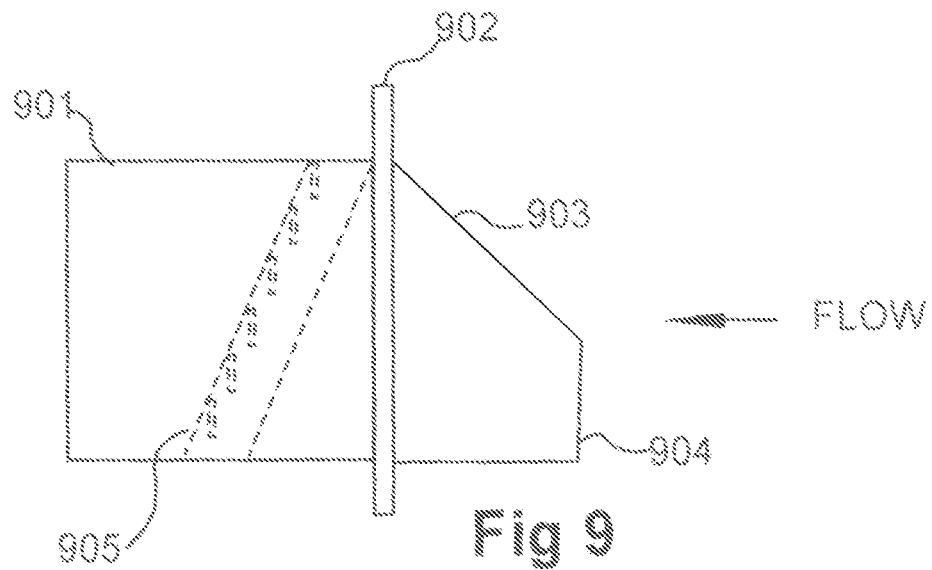
FIG. 9 is a side view of an embodiment of the invention used in conjunction with a collar.
Figure 10:
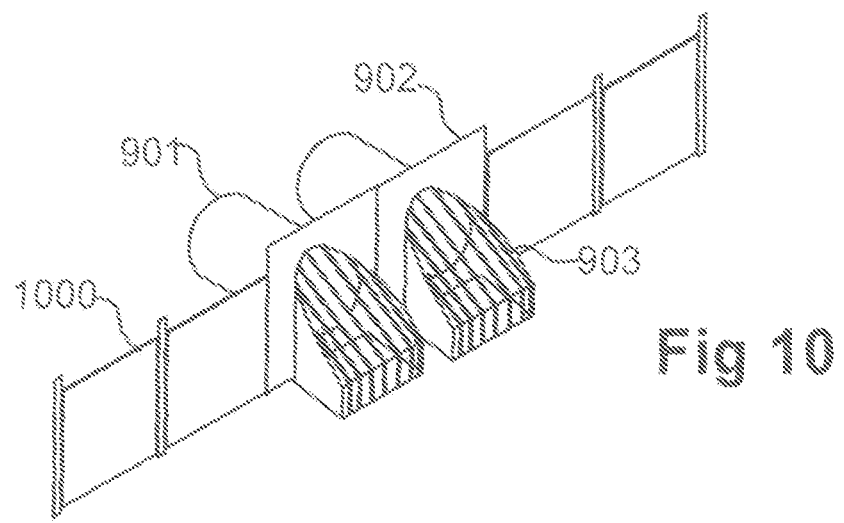
FIG. 10 is a perspective view of the embodiment of FIG. 9 incorporated into a water flow diversion device.

As shown in FIGS. 9 and 10 the baffle assembly of the invention is easily incorporated into a liquid flow diversion device such as temporary sediment containment and erosion control dams. A short section of pipe 901 is provided. The pipe has an inlet 904 with a grate 903. The baffle assembly 905 is mounted to the short section of pipe; for instance, by means of a collar 902. A fabric silt fence 1000 or other temporary water diversion structure is clamped to the collar. Soil carried by run-off water is directed to the inlet 904 and, hence, into the baffle assembly 905, which causes sedimentation of the soil upstream of the vanes. In this manner erosion is mitigated and the soil that is caught can be easily collected and replaced.

The present disclosure focuses on the application of the invention that is currently most evident; i.e., culverts handling sediment-bearing storm water and run-off, and the like. However, the baffle assembly disclosed here is useful in a wide variety of circumstances by being implemented in a variety of sizes. For instance, in industrial processes, wastewater treatment applications, and scientific contexts liquids tarrying particulate matter often flow through conduits, and the baffle assembly disclosed here may be beneficially employed to achieve clarification of the fluids or to collect valuable or useful solids that form the sediment.

The embodiments disclosed above make use of only a single baffle assembly. The scope of the invention, however, includes the use of a plurality of baffle assemblies in various combinations. For instance, two or more assemblies can be arranged in series, one downstream of another, to enhance sedimentation even further, particularly in areas where the sediment loading and flow rate are high. In such instances the heights of the inter-vane intervals can be judiciously adjusted between the baffle assemblies to maximize the perturbation of the water flow. Multiple baffle assemblies may also be employed in a side-by-side tandem arrangement as shown in FIG. 10. Such tandem arrangements may be planar or V-shaped. With respect to very large culverts or other types of water passage-ways, large arrays of staggered or off-set baffle assemblies may be beneficially employed.

Often culverts have a box or drop inlet. In such structures a covering grate may not accommodate the articulated baffle assembly in the manner disclosed above. In these situations the baffle assembly may be hung from brackets within the culvert or from hinge points on the box or drop.

Sediment reservoirs may be installed in the floor of the culvert or in the streambed just upstream of the vanes to provide additional capacity for accumulated sediment. The reservoirs may be of a type that include a removable bucket or collection vessel that is easily removed and emptied.

When a culvert is perpendicular to the drainage channel that it serves, the water enters the culvert at an angle from one or both directions, depending on the surface grade conditions. If there is not sufficient space for the drainage channel to be turned into a standard flared end section, the baffle assembly of the invention can be mounted in the culvert throat from a rectangular entry port with a right-side, left-side, or dual-side inlet. The top of the entry port may include a grate with linkage connections to the baffle assembly as shown in FIG. 1. The side inlets can be protected by grating. This is especially useful when a roadside embankment prevents practical maintenance access to the end section of a culvert.

SUMMARY

The invention may be summarized as a baffle assembly that functions to promote sedimentation at or near the inlet of a culvert or in a specified place in the path of a moving liquid. The invention comprises one or more vanes attached to a support. The support holds the vanes in the flow of water entering the inlet. The vanes create a perturbation in the flow, wherein the perturbation promotes sedimentation upstream of the vanes. Where there are a plurality of vanes, the vanes are spaced apart so as to allow the liquid to flow between the vanes. The baffle assembly may comprise a grate, and it comprises one or more articulations that facilitate temporary removal of the components of the invention from the inlet so that sediment can be cleared.

The invention may be summarized, at least in part, by the following enumerated statements:

Statement 1. The invention includes a baffle assembly comprising: a plurality of vanes 102; a support 101 that holds the vanes in the path of a flowing liquid when the baffle assembly is in an operational configuration; and, a first articulation 106, wherein the baffle assembly is rotated about the first articulation to reversibly position the baffle assembly in one of either the operational configuration or a retracted configuration, wherein when the baffle assembly is in the operational configuration (FIG. 3), flow of the liquid is perturbed by the vanes thereby promoting sedimentation from the liquid upstream of the vanes, and wherein when the baffle assembly is in the retracted position (FIG. 6) removal of sediment is facilitated.

Statement 2. The invention further includes the baffle assembly of Statement 1 wherein the first articulation 106 connects the support 101 to a pipe or culvert.

Statement 3. The invention further includes the baffle assembly of Statement 1 wherein ends of the vanes 102 are contoured.

Statement 4. The invention further includes the baffle assembly of Statement 1 wherein each vane is higher than the adjacent downstream vane when the baffle assembly is in the operational configuration.

Statement 5. The invention further includes the baffle assembly of Statement 1 further comprising: a rotating member 308; and, a second articulation 309, wherein the rotating member rotates about the second articulation.

Statement 6. The invention further includes the baffle assembly of Statement 5 wherein the rotating member is one of a bar and a grate 308.

Statement 7. The invention further includes the baffle assembly of Statement 5 wherein the first articulation 306 is between the support 301 and the rotating member 308.

Statement 8. The invention further includes the baffle assembly of Statement 1 wherein a vane angle of the vanes is within the range of plus or minus 60 degrees.

Statement 9. The invention further includes the baffle assembly of Statement 1 wherein a rise of the vanes is substantially equal to the length of a cross-axis of the vanes.

Statement 10. The invention further includes the baffle assembly of Statement 1 further comprising an anchor 310, wherein the anchor secures the support in place.

Statement 11. The invention further includes the baffle assembly of claim 1 further comprising an articulated lever system.

Statement 12. The invention further includes a method of using the baffle assembly of Statement 1, the method comprising the steps of: (a) putting the baffle assembly in place in the operational configuration 801; (b) inspecting the area adjacent to and upstream from the baffle assembly for sediment 802; (c) retracting the baffle assembly to a retracted configuration 803; (d) removing the sediment of Step (b) 804; (e) placing the baffle assembly back in the operational configuration 805; and (f) repeating Steps (b) through (e) as required to mitigate sediment build-up.

Statement 13. The invention further includes the method of Statement 12 wherein Step (a) comprises the step of placing the baffle assembly in the inlet of a pipe or culvert.

Statement 14. The invention further includes the method of Statement 13 wherein the inlet is connected to a liquid flow diversion device, wherein the flow of liquid is diverted into the inlet and through the baffle assembly by the liquid flow diversion device.

Statement 15. The invention further includes a culvert incorporating the baffle assembly of Statement 1.

Statement 16. The invention further includes a liquid flow diversion device incorporating said baffle assembly of claim 1.

The invention has been described here with respect to particular, preferred embodiments. For instance, application of the invention to culverts has been emphasized. However, from this disclosure those of skill in the art will recognize that the scope of the invention obviously extends beyond these particular embodiments. For instance, the invention is equally applicable to culverts, pipes, open waterways, and other types of conduits.

I claim:

1. A baffle assembly, comprising:
   1) a plurality of vanes; and,
   2) a support wherein said support supports said vanes in an operational configuration in which said vanes are held substantially horizontally across an inlet of a pipe or culvert and in a path of a liquid flowing into the inlet, and wherein said vanes are formed or trimmed to within about 0.5 inch of said inside surface of the pipe or culvert, whereby flow of the liquid is perturbed by said vanes thereby promoting sedimentation from the liquid at or near said inlet and upstream of said vanes.

2. A method of using said baffle assembly of claim 1 to promote sedimentation in the flowing liquid, said method comprising the steps of:
   (a) positioning said baffle assembly in the inlet; and,
   (b) placing said baffle assembly in the operational configuration, whereby sedimentation from the liquid is promoted at or near said inlet and upstream of said vanes.

3. The baffle assembly of claim 1 wherein ends of said vanes are contoured to approximate the curvature of the pipe or culvert.

4. The baffle assembly of claim 1 wherein each vane is positioned higher than its adjacent downstream vane when said baffle assembly is in the operational configuration.

5. The baffle assembly of claim 1 wherein a vane angle of said vanes is within the range of plus or minus 60 degrees.

6. The baffle assembly of claim 1 wherein a rise of said vanes is substantially equal to said vanes' width.

7. The baffle assembly of claim 1 further comprising an anchor, wherein said anchor secures said baffle assembly in place.

8. The baffle system of claim 1, further comprising:
   a first articulation, wherein said support is rotatable about said first articulation, such that by rotating said support about said first articulation said baffle assembly is reversibly converted from the operational configuration to a retracted configuration, wherein the retracted configuration facilitates removal of sediment that is produced while said baffle assembly is in the operational configuration.

9. The baffle assembly of claim 8 wherein said first articulation connects said support to the pipe or culvert.

10. A method of using said baffle assembly of claim 8 to promote sedimentation in the flowing liquid, said method comprising the steps of:
   (a) positioning said baffle assembly in the inlet;
   (b) placing said baffle assembly in the operational configuration;
   (c) converting said baffle assembly from the operational configuration to the retracted configuration;
   (d) removing the sediment while said baffle assembly is in the retracted configuration;
   (e) converting said baffle assembly back to the operational configuration; and
   (f) repeating Steps (a) through (e) as required to mitigate sediment build-up.

11. The baffle assembly of claim 8 further comprising:
   a rotating member, wherein said rotating member and said support are connected at or near their upper ends by means of said first articulation;
   a second articulation at or near said rotating member's lower end,
   wherein when said rotating member is rotated about said second articulation, the lower end of said support pivots toward said rotating member thereby converting said baffle assembly to the retracted configuration.

12. The baffle assembly of claim 11 further comprising an anchor, wherein said anchor secures said baffle assembly in place, and wherein said second articulation is between said rotating member and said anchor.

13. The baffle assembly of claim 11 wherein said rotating member is a grate.

14. A culvert having an inlet through which liquid flows into said culvert, and wherein said culvert incorporates said baffle assembly of claim 1 in said inlet.

15. A liquid flow diversion device incorporating said baffle assembly of claim 1.

16. The liquid flow diversion device of claim 15 wherein said liquid flow diversion device is a temporary sediment containment dam.

17. The liquid flow diversion device of claim 15 wherein said liquid flow diversion device is an erosion control dam.

18. A method of using a baffle assembly to promote sedimentation in a liquid flowing into the inlet of a pipe or culvert, said method comprising the steps of:
   (a) positioning the baffle assembly in the inlet, wherein the baffle assembly comprises:
      1) a plurality of vanes; and,
      2) a support that supports the vanes in an operational configuration in which the vanes are held in a path of the liquid, whereby flow of the liquid entering the pipe or culvert is perturbed by the vanes, thereby promoting sedimentation from the liquid at or near the inlet and upstream of the vanes; and, (b) placing the baffle assembly in the operational configuration, whereby sedimentation from the liquid is promoted at or near the inlet and upstream of the vanes.

* * * * *